United States Patent [19]

Fast

[11] Patent Number: 5,044,109
[45] Date of Patent: Sep. 3, 1991

[54] FISHING ROD HOLDER

[76] Inventor: Jacob B. Fast, 8150 Bernice, Center Line, Mich. 48015

[21] Appl. No.: 546,734

[22] Filed: Jul. 2, 1990

[51] Int. Cl.⁵ ............................................ A01K 97/10
[52] U.S. Cl. ..................................................... 43/21.2
[58] Field of Search .................. 43/21.2, 16; 224/199, 224/200, 226

[56] References Cited

U.S. PATENT DOCUMENTS

| | | | |
|---|---|---|---|
| 2,491,008 | 12/1949 | Lake | 43/21.2 |
| 2,576,624 | 11/1951 | Miller | 43/21.2 |
| 2,658,650 | 11/1953 | Jasper | 224/200 |
| 2,995,855 | 8/1961 | Bell | 43/21.2 |
| 3,021,101 | 2/1962 | Gliebe | 43/21.2 |
| 3,159,939 | 12/1964 | Transeau | 43/21.2 |
| 3,874,573 | 4/1975 | Fruscell et al. | 43/21.2 |
| 4,081,115 | 3/1978 | White et al. | 43/21.2 |
| 4,323,181 | 4/1982 | Spasoff | 43/21.2 |
| 4,534,063 | 8/1985 | Krumin et al. | 224/199 |
| 4,587,757 | 5/1986 | Lirette | 43/21.2 |
| 4,669,214 | 6/1987 | Behrle | 43/21.2 |
| 4,817,323 | 4/1989 | Braid | 43/21.2 |
| 4,828,152 | 5/1989 | Pepping | 43/21.2 |

Primary Examiner—Kurt Rowan
Assistant Examiner—Chuck Y. Mah
Attorney, Agent, or Firm—Peter D. Keefe

[57] ABSTRACT

A fishing rod holder which is compact and easily mounted and demounted with respect to the clothing of the fisherman, particularly trousers, with or without a belt. The present invention is composed of a pressure distributing back plate, a fishing rod handle receptacle mounted to a front side of the back plate, and a clothing connection member connected with the back side of the backing plate for releasably securing the back plate to the fisherman's clothing. The preferred structure of clothing connection member is a lip which is structure to slip over the trousers or belt and trousers of the fisherman. It is preferred that the fishing rod handle receptacle be angled relative to the baking plate so that the fishing rod when mounted thereto will assume a comfortable, customary angle normally used for fishing so that the fishing pole will perform optimally.

9 Claims, 1 Drawing Sheet

FISHING ROD HOLDER

BACKGROUND OF THE INVENTION

1. Field of the Invention

The present invention relates to holders for the handle portion of a fishing rod, and more particularly to a fishing rod holder which mounts removably with respect to the fisherman's clothing.

2. Description of the Prior Art

Fisherman who fish for trophy size game fish, such as salmon and trout on the Great Lakes, are frequently subjected to discomfort caused by the fishing rod handle end digging into the fisherman's body at or near the waist or abdoment. This situation is brough about by the considerable forces generated on the fishing rod by the action of the fish and the fisherman's periodic reeling-in movements. Thus, practically every fisherman who has landed (or attempted to land) a large fighting fish can recount how he/she used his/her waist area as a fishing rod end support to advantage, and they can also report how their tummies hurt later that day due to the pressure of the fishing rod end on their body.

While perhaps the simplest solution is to simply not let the fishing rod end touch the fisherman's body, in practice this is not so very easy to accomplish. There are many inexperienced fisherman who would be unable to manipulate their fishing rod in a manner that would avoid tummy contact. Further, there are many fisherman who because of advanced age or infirmity are unable to control their fishing rod sufficiently to avoid tummy contact. Indeed, even the most sophisticated of fisherman will forget about their tummies when all that is on their mind is landing "the big one". Ergo, there is a distinct need to provide some form of device which can prevent body injury during the landing of large fighting fish.

There are attempts in the prior art to provide a fishing rod support mechanism, as follows. U.S. Pat. No. 3,159,939 to Transeau, dated Dec. 8, 1964, discloses a fishing rod pad which detachably interconnects with the handle of a fishing rod, but does not attach to the fisherman. U.S. Pat. No. 3,874,573 to Fruscell et al, dated Apr. 1, 1975, discloses a holster type of fishing rod holder which requires a belt and the fishing rod is held at the left side of the fisherman so that he/she may perform other tasks and not have to place the fishing rod down thereduring. U.S. Pat. No. 4,081,115 to White et al, dated Mar. 28, 1978, discloses a special belt having a front mount using a ball and socket system for holding a fishing rod at the handle end. U.S. Pat. No. 4,587,757 to Lirette, dated May 13, 1986, discloses a special belt having a pivotable mount for holding the handle end of a fishing rod. U.S. Pat. No. 4,669,214 to Behrle, dated June 2, 1987, discloses a belt buckle for a special belt which connects with a spiral shaped fishing rod handle holder. U.S. Pat. No. 4,817,323 to Braid, dated Apr. 4, 1989, discloses a special belt which includes a fishing rod holder in the form of a rigid pad which accepts the fishing rod handle end at a "V" shaped rib. Finally, U.S. Pat. No. 4,828,152 to Pepping, dated May 9, 1989, discloses a belt-like fisherman's harness featuring a plate onto which the fishing rod is pivotably mounted, but also held secure by harness straps.

While each of the foregoing devices attempts to solve the problem of discomfort to the tummy area occasioned by the landing of large game fish, there yet remains the very definite need to provide a simple, inexpensive device which is compact enough to be stored in a tackle box, and can be easily exchanged among fellow fisherman as they may mutually have need.

SUMMARY OF THE INVENTION

The present invention is a fishing rod holder which is compact and easily mounted and demounted with respect to the clothing of the fisherman, particularly trousers, with or without a belt.

The present invention is composed of a pressure distributing back plate, a fishing rod handle receptacle mounted to a front side of the back plate, and a clothing connection member connected with the back side of the backing plate for releasably securing the backing plate to the fisherman's clothing. The preferred structure of clothing connection member is a lip which is structured to slip over the trousers, or belt and trousers, of the fisherman. It is preferred that the fishing rod handle receptacle be angled relative to the baking plate so that the fishing rod when mounted thereto will assume a comfortable, customary angle that optimizes fishing rod performance.

In operation, the fisherman would slip the lip over the waist band of his trousers (or of her skirt or pants), then the handle of the fishing rod would be gently inserted into the fishing rod handle receptacle. In this manner, the fishing rod will not hurt the fisherman in any way, and for those fisherman who are in some way or other disabled, the fishing rod will remain in an attitude relative to the fisherman which is best for landing a caught fish.

Accordingly, it is an object of the present invention to provide a fishing rod holder which is easily connected to and removed from the fisherman's everyday clothing.

It is an additional object of the present invention to provide a fishing rod holder which is small enough to be stored in the fisherman's tackle box.

It is a further object of the present invention to provide a fishing rod holder which is light and inexpensive, yet provides comfort to the fisherman in that the end of the fishing rod will not come into contact with the fisherman, and any forces associated therewith will be distributed over a large area of the fisherman's abdomen or waist region.

It is yet another object of the present invention to provide a fishing rod holder which holds the fishing rod in a comfortable and customary attitude for normal fishing, thereby assisting fisherman to hold their rods in the preferred orientation for catching fish, inclusive of handicapped or novice fishermen.

It is still a further object of the present invention to provide a fishing rod holder which holds the fishing rod for the fisherman, thereby lessening fatigue and increasing his/her enjoyment of fishing.

It is yet an additional object of the present invention to provide a fishing rod holder which holds the fishing rod for the fisherman, thereby freeing him/her to use one or both hands for other than holding of the fishing rod.

It is yet another object of the present invention to provide a fishing rod holder which holds the fishing rod at the best angle for ensuring that the rod will absorb the majority of shock, not the fishing line, and too, the fishing line is always under tension with respect to the fish.

It is still a further object of the present invention to provide a fishing rod holder which holds the fishing rod comfortably against the fisherman's abdomen, thereby allowing the fisherman to better sense (and thereby faster react to) any tension changes sensed at his/her abdomen which signal fish action on the fishing line (as opposed to only relying on hand sensation in conventional fishing practice).

It is yet a further object of the present invention to provide a fishing rod holder which holds a fishing rod for the fisherman, whether the fisherman is standing or seated.

It is still another object of the present invention to provide a fishing rod holder which is durable in that is has no moving parts.

These, and additional objects, advantages, features and benefits of the present invention will become apparent from the following specification.

DETAILED DESCRIPTION OF THE PREFERRED EMBODIMENT

Figure 1:
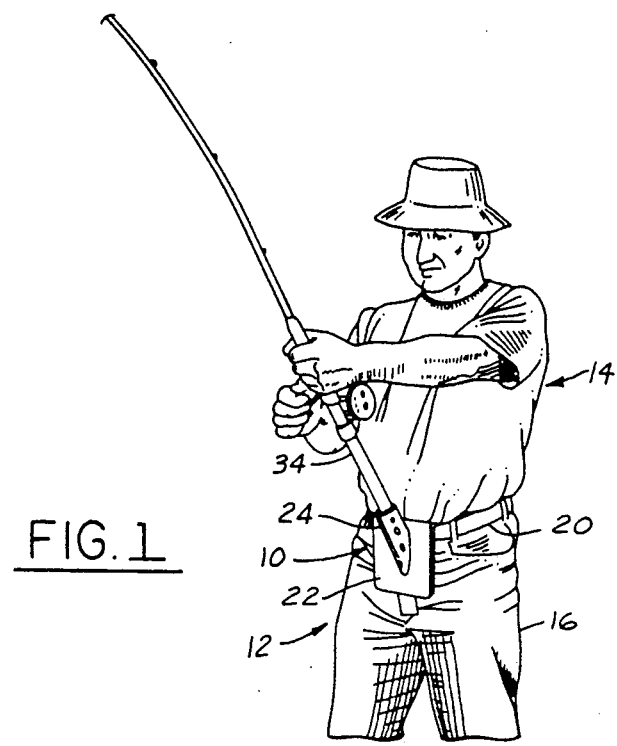
FIG. 1 is a perspective view of the fishing rod holder according to the present invention shown in operation with a fisherman.
Figure 2:
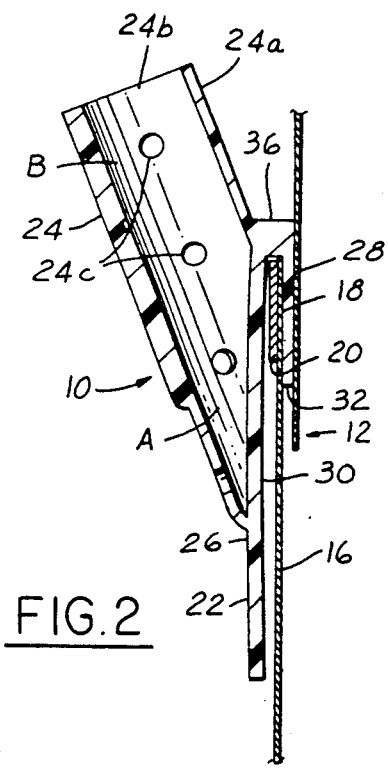
FIG. 2 is a sectional side view of the fishing rod holder according to the present invention as depicted in FIG. 1, shown in use with a fisherman and his everyday clothing.
Figure 3:
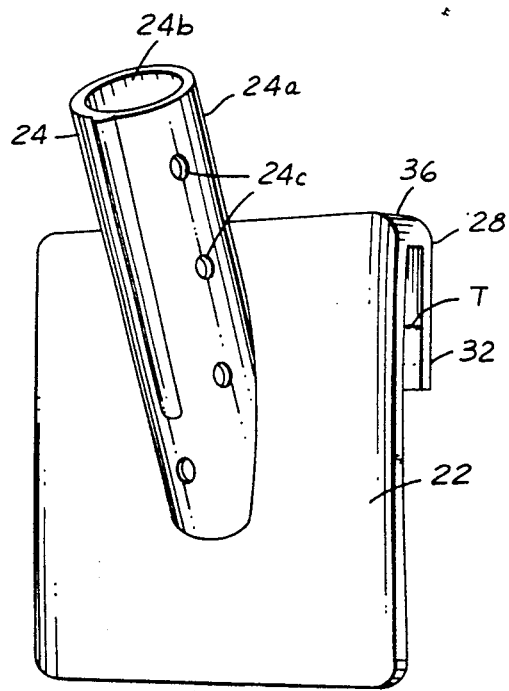
FIG. 3 is a perspective view of the fishing rod holder according to the present invention.

Referring now to the Drawing, FIGS. 1 and 2 show the fishing rod holder 10 according to the present invention in operation with respect to the clothing 12 of a fisherman 14. In this respect, the clothing 12 is of the everyday variety in terms of pants, trousers, shorts or the like 16 having a waist band 18 and, most commonly as well, a belt 20 connected therewith. As can be discerned from the two figures, the fishing rod holder 10 is interconnected in a releasable manner to the clothing 12 of the fisherman in a manner which will be described fully hereinbelow.

The fishing rod holder 10 is composed of a pressure distributing back plate 22, a fishing rod handle receptacle 24 mounted to a front side 26 of the back plate, and a clothing connection member 28 connected with the back side 30 of the backing plate for releasably securing the backing plate to the fisherman's clothing 12.

The back plate 22 is preferred to have a surface area which will comfortably distribute any forces generated by the fishing rod comfortably over an area of the fisherman's waist region. Further, it is preferred to dimension the back plate so as to ensure that it will not untowardly twist in response to fish action, when, as will be further elaborated below the fishing rod holder 10 is in operation. Yet, it is also preferred to construct the back plate 22, the fishing rod receptacle 24 and the clothing connection member 28 so that the over-all dimensions of the fishing rod holder 10 permit it to be stored inside a conventional tackle box. It is also preferred for the back plate 22 to be gently curved concavely on the back side 30 so as to match the natural curve of the waist of the fisherman. As an example, a back plate 22 may be dimensioned in the neighborhood of 5.5 by 5.5 inches, and be about one-quarter inch thick.

It is preferred that the fishing rod handle receptacle 24 be connected with the back plate 22 so that it is angled relative to the back plate. Thus, when a fishing rod 34 is mounted thereto, the fishing rod will assume a comfortable, customary angle normally used for fishing. The fishing rod receptacle is structured in the form of a cylindrical projection 24a having an interior blind bore 24b. The blind bore 24b is dimensioned so as to be able to receive the handle of a standard fishing rod 34. Because of the angle of mounting of the fishing rod handle receptacle 24 relative to the back plate 22, a portion A of the blind bore tapers at is blind end. It is preferred to include relief holes 24c for purposes of allowing water or other matter to escape freely the blind bore 24b. The size of the fishing rod handle receptacle should be such that the length of the untapered portion B of the blind bore is sufficient to assuredly hold the fishing rod 34 therein even during very demanding fishing action, when large forces can be applied thereto from the fishing rod. Typically, about a three to four inch untapered portion B of the blind bore 24b should be sufficient, and yet allow the fishing rod holder 10 to be storable in a tackle box.

The preferred structure of clothing connection member 28, as depicted in the Drawing, is that of a lip 32 which is structured to be spaced from the back side 30 of the back plate 22 a distance T so as to permit it to slip over the waist band 18 of the trousers, or belt and trousers, of the fisherman. As shown in FIGS. 1 and 2, the lip has been spaced the distance T from the back side of the back plate sufficiently to permit it to slip over the fisherman's trousers 16 and belt 20 (which may include the buckle therefor). Where the back plate is curved, as described above, so to, in complementary fashion, is the lip. It is preferred to connect the lip at the upper end 36 of the back plate 22 so that the center of gravity of the fishing rod holder 10 is as low as possible, thereby giving better over-all control and comfort to the fisherman during strenuous fishing episodes.

It is preferred for the entire structure of the fishing rod holder 10 to be an integral single piece which may be preferably formed by casting or injection molding. It is further preferred to construct the fishing rod holder 10 of a light, durable, strong and non-corrosive material, such as particularly plastic, or alternatively, aluminum.

In operation, the fisherman would place the lip over his/her clothing waist band, then slip the lip thereover at a location approximately directly in front of the fisherman. Next, the handle portion of the fishing rod would be slid into the untapered portion of the blind bore of the fishing rod receptacle. Now the fisherman is ready to use his/her fishing rod in a more-or-less normal manner, except that the over possible fishing rod handle discomfort is obviated. Further, the fishing rod will now assume a natural, customary orientation preferred for catching fish (the fishing rod should be angled to ensure that the rod portion of the fishing rod absorbs the majority of the shock of sudden fish tugs, not the fishing line, and that the fishing line remains taught during action). Those unfortunate (or, alternatively, those lazy) fisherman who have trouble handling their fishing poles will be able to concentrate more on the reel action, rather than holding the fishing rod, because the fishing rod holder 10 does this for them, thereby helping them catch fish!

To those skilled in the art to which this invention appertains, the above described preferred embodiment may be subject to change or modification. For instance, the clothing connection member could be structured alternatively as a belt loop. Further, the lip may be constructed so as to be resilient, thereby biasably pinching the fisherman's clothing. Such change or modification can be carried out without departing from the scope of the invention, which is intended to be limited only by the scope of the appended claims.

What is claimed is:

1. A fishing rod holder for selectively releasably connecting with respect to clothing worn by a fisherman for holding a fishing rod for use during fishing, said fishing rod holder comprising:

a back plate, said back plate having a front side and a back side, said back plate further having an upper end;

fishing rod receptacle means having a plurality of relief holes, said fishing rod receptacle rigidly connected to said front side of said back plate for releasably receiving a handle portion of a fishing rod in a preselected orientation relative to said back plate; and clothing connection means connected with said back plate adjacent said back side thereof for releasably connecting with a selected portion of the clothing worn by the fisherman so as to thereby secure said back plate in a fixed relationship relative to the fisherman, said clothing connection means comprising a lip rigidly connected with said back plate, said lip connecting to said back plate substantially along said upper end of said back plate, said lip extending relative to said back side of said back plate so that the selected portion of the clothing worn by the fisherman may be slipped between said lip and said back side of said back plate for releasably securing said back plate to the clothing worn by the fisherman.

2. The fishing rod holder of claim 1, wherein fishing rod receptacle means comprises a generally cylindrically shaped projection member connected with said front side of said back plate, said generally cylindrically shaped projection member having an interior blind bore for receiving the handle portion of a fishing rod.

3. The fishing rod holder of claim 2, wherein said fishing rod receptacle is connected with said back plate at a predetermined angle which provides for the fishing rod to have an orientation relative to the fisherman which provides for optimum functioning of the fishing rod.

4. The fishing rod holder of claim 3, wherein the generally cylindrically shaped projection member has at least one relief hole for releasing matter from said blind bore.

5. The fishing rod holder of claim 4, wherein the selected portion of the clothing worn by the fisherman comprises a waist band, the waist band being slipped between said lip and said back side of said back plate so that said lip retains said back plate relative to the clothing worn by the fisherman.

6. The fishing rod holder of claim 5, wherein the selected portion of the clothing worn by the fisherman further comprises a belt located adjacent the waist band, the waist band and the belt being slipped between said lip and said back side of said back plate so that said lip retains said back plate relative to the clothing worn by the fisherman.

7. The fishing rod holder of claim 4, wherein said back plate is curved concavely at said back side so as to substantially match a curve of the fisherman's waistline.

8. The fishing rod holder of claim 7, wherein said lip is curved to complementarily match said curve of said back plate.

9. The fishing rod holder of claim 7, wherein said back plate and said lip are dimensioned so that when a fishing rod has been received by said fishing rod holder and said clothing connection means has been connected with a selected portion of the fisherman's clothing, the fishing rod will be held by said fishing rod holder at a substantially conventional orientation relative to the fisherman without untowardly twisting with respect to the fisherman's clothing in response to fish action.

* * * * *